United States Patent
Fogh et al.

(10) Patent No.: US 6,354,508 B1
(45) Date of Patent: Mar. 12, 2002

(54) ELECTRONIC TEMPERATURE CONTROLLER, PARTICULARLY FOR REFRIGERATION APPLIANCES

(75) Inventors: Hans Erik Fogh, Broager; Axel Schønwandt, Augustenborg, both of (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/529,625

(22) PCT Filed: Oct. 20, 1998

(86) PCT No.: PCT/DK98/00456

§ 371 Date: Apr. 17, 2000

§ 102(e) Date: Apr. 17, 2000

(87) PCT Pub. No.: WO99/22283

PCT Pub. Date: May 6, 1999

(51) Int. Cl.[7] .............................................. G05D 15/00
(52) U.S. Cl. ........................ 236/78 R; 62/230; 62/126
(58) Field of Search ............................ 236/78 R, 78 A, 236/78 B, 78 C, 78 D; 62/126, 230, 228.1; 307/75; 323/233

(56) References Cited

U.S. PATENT DOCUMENTS

| | | | | |
|---|---|---|---|---|
| 3,691,782 A | * | 9/1972 | Holzer | 236/78 B |
| 3,703,086 A | * | 11/1972 | Nijo | 236/78 B |
| 4,283,921 A | * | 8/1981 | Prosky | 62/126 |
| 4,314,666 A | * | 2/1982 | Schotten | 236/78 R |
| 4,591,728 A | * | 5/1986 | Kruger et al. | 307/75 |
| 4,827,731 A | * | 5/1989 | Ikeda | 236/78 R |
| 4,875,342 A | * | 10/1989 | Ikeda | 236/78 R |

FOREIGN PATENT DOCUMENTS

| | | | |
|---|---|---|---|
| DE | 2445172 | * | 4/1976 |
| DE | 3141736 | * | 5/1983 |
| GB | 2107905 | * | 5/1983 |
| GB | 2136643 | * | 9/1984 |

* cited by examiner

*Primary Examiner*—Teresa Walberg
*Assistant Examiner*—Fadi H. Dahbour
(74) *Attorney, Agent, or Firm*—Lee, Mann, Smith, McWilliams, Sweeney and Ohlson

(57) ABSTRACT

The invention concerns an electronic temperature controller, particularly for refrigeration appliances, with mains connections (3, 4) and an electronic circuit (1) having a power supply (7), a control unit and measuring and setting elements (9, 10, 11). The mains connections (3, 4) are connected with the power supply (7) via protective impedances (5, 6) consisting of at least two single impedances connected in series, and the electronic circuit is dimensioned for an operating current of maximum 0.35 mA (peak value) when connected to an AC mains and maximum 1 mA when connected to a DC mains. These values are doubled, when the electronic circuit has an earthing connection. This gives safety for the operator through shock-proof protection, which can be achieved at low cost and with small dimensions.

35 Claims, 2 Drawing Sheets

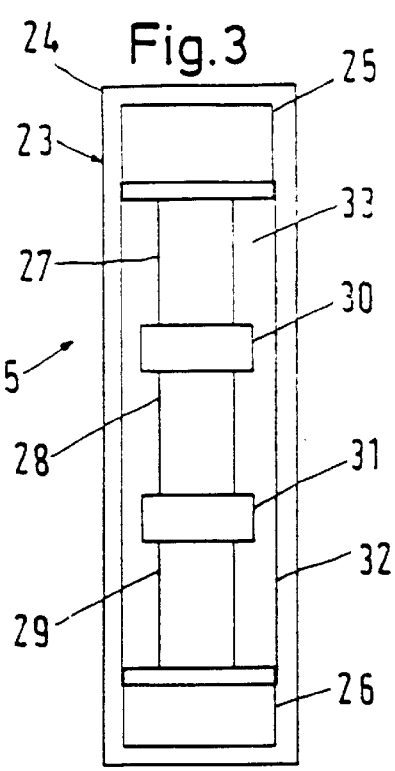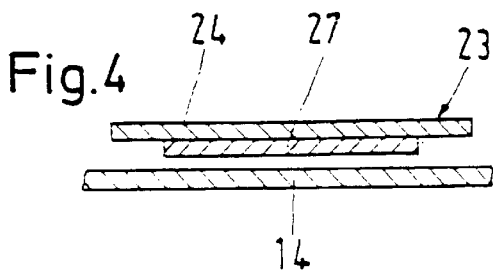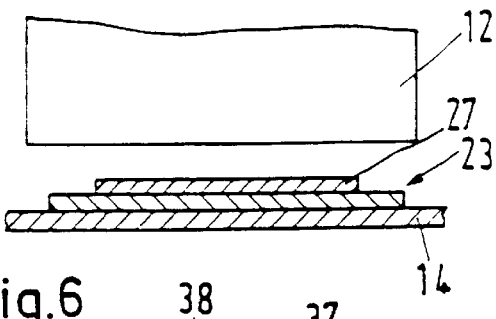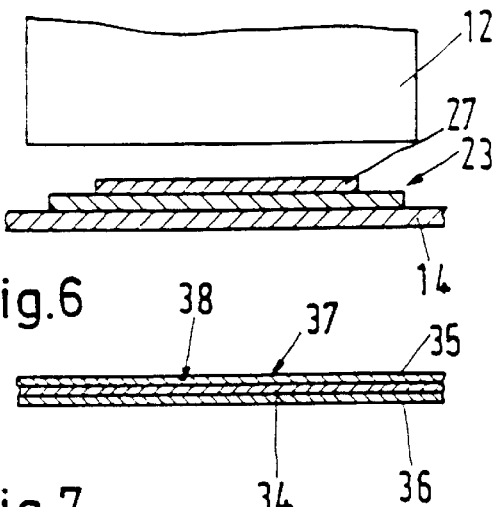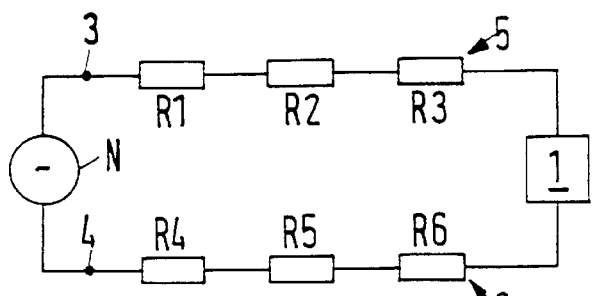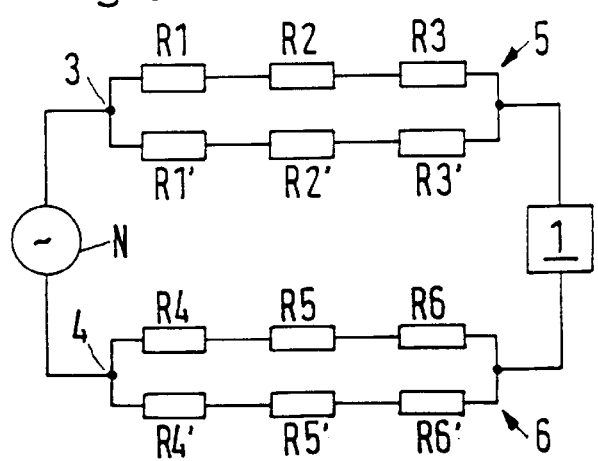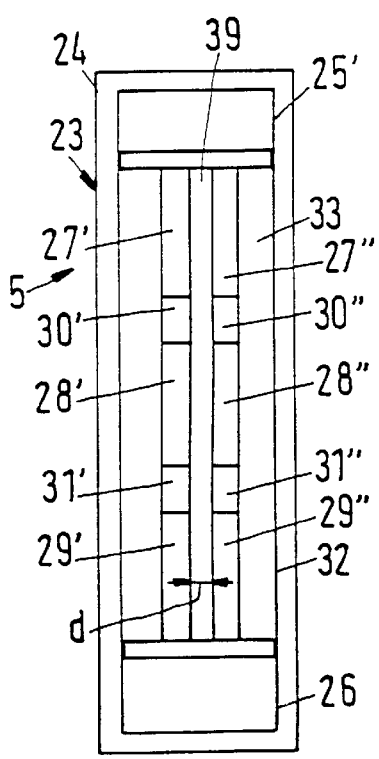

ELECTRONIC TEMPERATURE CONTROLLER, PARTICULARLY FOR REFRIGERATION APPLIANCES

Figure 1:
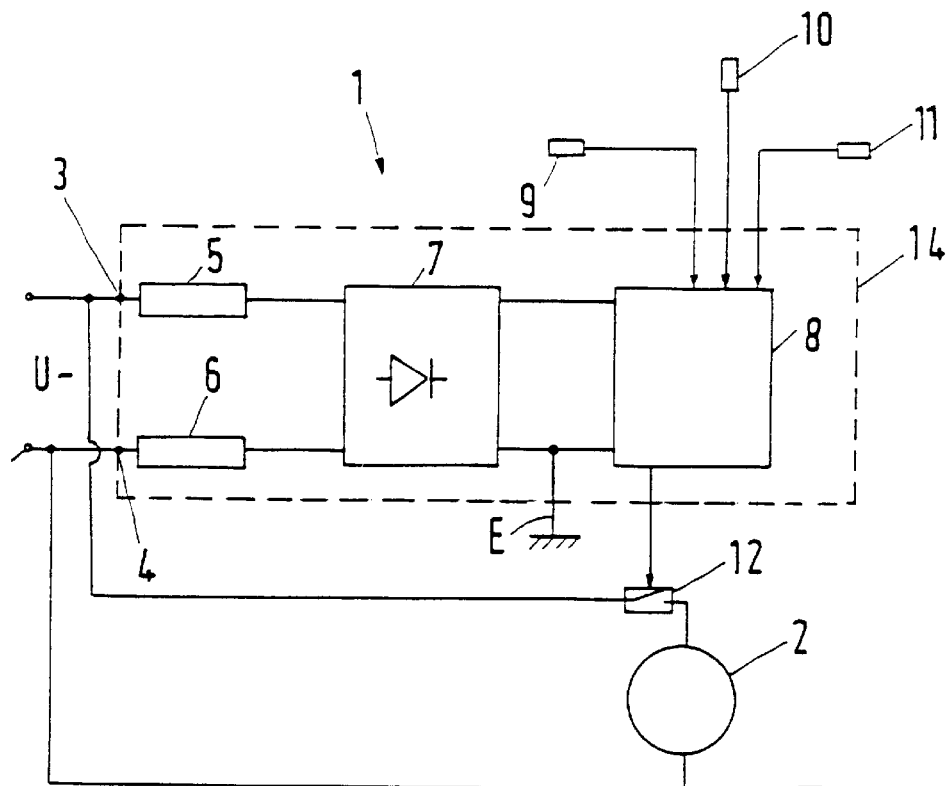

The invention concerns an electronic temperature controller, particularly for refrigeration appliances, with mains connections and an electronic circuit having a power supply part, a control unit and measuring and setting elements.

Such a temperature controller is known from DE 24 45 172 A1. A small housing arranged on the sidewall of a refrigerator houses the larger part of the electronic circuit. Merely an NTC (Negative Temperature Coefficient) resistor measuring the refrigerator temperature is connected with it via a wire. The resistor is connected in series with a potentiometer, which is manually operable when the refrigerator door is open. The power supply for the electronic circuit is delivered by a 220 V AC mains, which is rectified in a power supply part. The control circuit operates an electronic switch, for example a thyristor or a triac, which is connected in series with a refrigerant compressor.

The NTC resistor is surrounded by a plastic insulating compound, which provides a certain shock protection, but is expensive and increases the thermal time constant of the control, which is often undesirable. The running of the connecting wire to the NTC resistor must be well isolated. The remaining parts of the electronic circuit, except for the rotary knob of the potentiometer are protected against touch by the housing.

DE 31 41 736 C2 discloses a temperature controller comprising an electronic monitoring arrangement and a conventional, non-electronic thermostat. The monitoring arrangement carries low voltage and is galvanically separated from the mains voltage by a transformer. Signals between the two galvanically separated systems are transmitted by means of optocouplers.

The low voltage offers a sufficient shock protection, however requires a transformer, that is, an expensive and large component, which cannot be accommodated in the normal temperature controller housing designs.

Instead of the traditional ways of reaching shock protection, the international standard EN 60730-1, edition 1993-10 (IEC 730-1), Annex H:"Automatic electrical controls for household and similar use" describes a different technique of reaching shock protection. This becomes possible through the use of a protective impedance, which reduces a possible discharge or fault current to maximum 0.7 mA AC (peak value) or 2 mA DC (Chapter H8.1.10.1). The protective impedance is created in that at least two single impedances are connected in series, that is, at least two single impedances between the phase conductor mains connection and the electronics and also at least two single impedances between the zero conductor mains connection and the electronics (chapter H11.2.5).

The purpose of the invention is to provide a shock proof electronic temperature controller needing little space and being inexpensive in production.

According to the invention this task is solved in that the mains connections are connected with the power supply part via protective impedances consisting of at least two single impedances connected in series, and that the electronic circuit is dimensioned for an operating current of maximum 0.35 mA (peak value) when connected to an AC mains and maximum 1 mA when connected to a DC mains.

Due to the shock protection provided by the protective impedances according to EN 60730-1, Annex H, an expensive isolation can be avoided. Sensor elements for evaporator temperature and/or cold room temperature can be placed anywhere. Also the nominal temperature setting arrangement is safe to be touched by the user. In this connection it is necessary for the electronic circuit to be dimensioned so that a very low operating current, which is far lower than the normal values for electronic temperature controllers, will be sufficient.

Another solution of the task, which permits higher operating currents, involves that the mains connections are connected with the power supply part via protective impedances comprising at least two single impedances connected in series, and that the electronic circuit has an earthing connection and is dimensioned for an operating current of less than 0.7 mA (peak value) when connected to an AC mains or less than 2 mA when connected to a DC mains.

It is recommendable that at least the protective impedances, the power supply part and the control part are arranged on a common carrier. The fitting on the common carrier, in particular a printed circuit board, keeps the protective impedances and the other components safely in place, so that small distances will be sufficient. It is possible to accommodate a complete electronic temperature controller in a standard housing, which normally comprises a bimetal setting arrangement and is connected with a fluid-filled capillary tube leading to the evaporator. The individual parts are easy to manufacture, so that in total the electronic temperature controller is inexpensive.

Advantageously, the protective impedances are formed by discrete components, each having a basic substrate on the ends of which connection terminals and between which the at least two single impedances are arranged. The embodiment as discrete component offers the opportunity to provide an adaptation to different mains voltages. The embodiment permits safe functioning of the protective impedances even with the smallest dimensions.

Advantageously, the single impedances are ohmic resistors. These require less space than an inductivity or a capacity.

This particularly applies when the ohmic resistors are applied on the basic substrate as thick film.

It is particularly advantageous for each protective impedance to have three ohmic resistors connected in series. Meeting the dimensioning regulations of EN 60730-1 this gives particularly small component dimensions.

In this connection it is recommended that each ohmic resistor is covered by an isolating layer and is dimensioned so that a voltage drop of maximum 50 V (effective value) will occur at maximum operating current. This is reached at a mains alternating voltage of 240 V (effective value), when three resistors are connected in series in each of the two protective impedances. In this way, small creepage distances and thus also small dimensions can be reached.

In a preferred further embodiment it is provided that the protective impedances are formed by discrete components fitted on the carrier, the live parts being arranged on the surfaces of the components facing the carrier. Thus, the protective impedances are still shock-proof when the housing is removed.

In an alternative embodiment this effect is reached in that the protective impedances are covered by a component, which is also fitted on the carrier.

Preferably, this component is a switching relay. The dimensions of such a relay, including its housing, are sufficient for the covering. When fitted on the common carrier, however, it can also be arranged in a normal housing.

A further alternative involves that the carrier is a printed circuit board and that the protective impedances are arranged inside the printed circuit board. Such a printed circuit board can be made in multilayer technique, the single impedances being arranged between an upper and a lower covering layer.

Additionally, it is advantageous that the carrier has sensor element connections. The sensors, which can be connected here, can be installed without a definite isolation.

It is also recommended that a setting potentiometer is fitted on the carrier. As it is shock proof due to the protective impedances, special measures are not required here either.

In a preferred embodiment it is provided that the control part drives a bistable switching relay. Bistable switching relays cost about 20% more than ordinary monostable relays. However, the latter need a relatively large, constant energy supply to maintain their position, whereas a bistable relay only needs one impulse for the switching.

Expediently, a storage capacitor is allocated to the bistable switching relay. As the current consumption of the electronic circuit is limited due to the protective impedances, the storage capacitor provides that in the switching moment a sufficient current impulse is available for the bistable switching relay.

In a further embodiment of the invention the bistable switching relay and the storage capacitor are also fitted on the carrier. All these parts can be held in a relatively small housing.

Another opportunity of keeping the operating current small exists in that the control part samples the measuring values from the sensors at temporal intervals.

It is also advantageous that each protective impedance has at least two parallel branches, each comprising at least two single impedances connected in series. This results in impedance values permitting an operating current close to the upper limit value.

Figure 2:
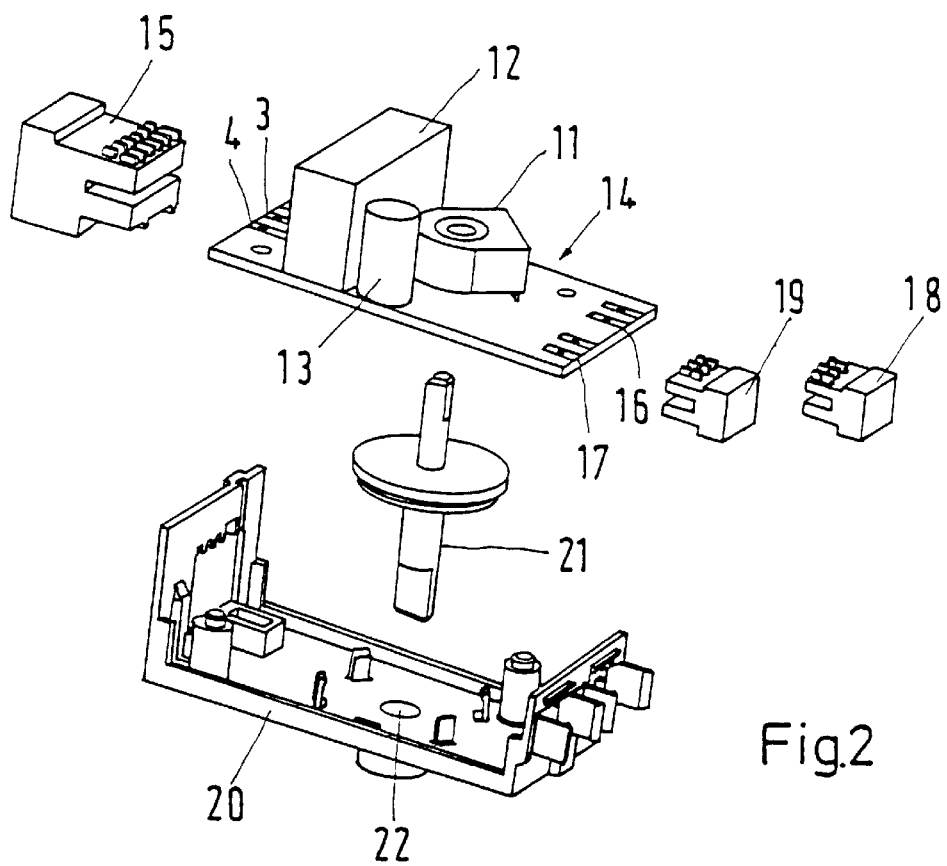

In the following the invention is explained on the basis of preferred embodiments in connection with the drawings, showing:

FIG. 1 an electrical block diagram of the temperature controller according to the invention FIG. 2 an exploded view of the temperature controller FIG. 3 a top view of an embodiment of a protective impedance FIG. 4 a section through a flush embodiment of the protective impedance in FIG. 3

FIG. 5 a section through a second flush embodiment of the protective impedance in FIG. 3

FIG. 6 a section through a printed circuit board with embedded protective impedance FIG. 7 a schematic circuit diagram with protective impedances according to FIG. 3

FIG. 8 a schematic circuit diagram with modified protective impedances

FIG. 9 a top view of a protective impedance according to FIG. 8.

The block diagram in FIG. 1 shows the electronic circuit 1 of a temperature controller and a motor 2 of a refrigerant compressor controlled by it, temperature controller and motor being supplied with a voltage U~ of for example 230 V from an AC mains. The electronic circuit 1 is supplied via two mains connections 3 and 4. In the phase conductor there is a protective impedance 5, in the zero conductor a protective impedance 6. A power supply part 7 is formed by a rectifier circuit, which supplies a control part 8 with DC current. The control unit 8 receives temperature signals from a sensor 9, which is arranged in the refrigerating chamber, and from a sensor 10 arranged on the evaporator. Further, a potentiometer 11 is provided as setting element, which produces a signal for the nominal temperature. By means of these input values the control unit 8 decides, whether the motor 2 of the refrigerant compressor must be activated or not. For this purpose it sends a corresponding signal to a switching relay 12, which is placed in the current circuit of the motor 2. If desired, the electronic circuit can also have an earth connection E.

The electronic circuit 1 is dimensioned for a very low current consumption. In the non-earthed condition the operating current must amount to maximum 0.35 mA (peak value) (when connected to a DC mains, maximum 1 mA). In the earthed condition the maximum values are 0.7 mA (peak value) or 2 mA, respectively. Taking into consideration the standard EN 60730-1, these values can also be considerably lower, depending on the protective impedances used.

This considerable reduction of the current consumption is among others reached in that the switching relay 12 is a bistable relay, which can be turned on and off by a switching impulse. This switching impulse is made available by means of a storage capacitor 13 (FIG. 2). Energy is also saved in connection with the sensors. Thus, the measuring elements are only sampled at temporal intervals, for example once per second. Thus a constant measuring current is not flowing.

According to FIG. 1 the mains connections 3 and 4, the protective impedances 5 and 6, the power supply part 7 and the control unit 8 are fitted on a common carrier 14, namely a printed circuit board. FIG. 2 shows that the carrier 14 also accommodates the potentiometer 11, the switching relay 12 and the capacitor 13. A plug 15 interacts with the mains connections 3 and 4. With connections 16 and 17 for the sensors 9 and 10, plugs 18 and 19 interact. The carrier 14 is inserted in a housing 20, having the normal dimensions for conventional refrigerator temperature controllers. Refrigerator and freezer manufacturers can thus, without changing shapes or dimensions of the cabinets, replace the conventional temperature controller by an electronic one. The potentiometer 11 can be operated by a rotation axis 21, which projects from an opening 22 in the housing 20 and is provided with a rotary knob.

The protective impedances 5 and 6 are identical. They comprise at least two single impedances connected in series. In the embodiment in FIG. 3 the protective impedance 5 is formed by a discrete component 23, which, on a basic ceramic substrate 24, carries two connection terminals 25 and 26 arranged on the ends, which terminals are connected with each other via three applied resistors 27, 28 and 29 and inserted metal film or strips 30 and 31. Additionally, the whole arrangement is covered by an isolating layer 32, particularly of glass or epoxy, which is in contact with the area 33 with the basic substrate 24 and also the remaining applied parts, however, leaving the connection terminals 25 and 26 uncovered. The thick film is of the coal film type, which is not particularly inductive and also has no serious parasitic capacitances.

The European standard EN 60730-1 prescribes that the creepage distance for reinforced isolation between two points must be at least 8 mm, when the voltage difference between these two points exceeds 130 V (effective value). The creepage distance can be smaller, if the voltage difference is lower. Thus, the creepage distance can be reduced to 3 mm, if the voltage difference is less than 50 V (effective value). The additional coating of the protective impedances with the isolation layer 32 permits a reduction of the creepage distance to 2 mm, which corresponds to the distance between the connection terminal 25 and the metal strip 30, the distance between the connection terminal 26 and the metal strip 31, and the distance between the two metal strips 30 and 31. In the example shown, the resistors are calibrated at 243 kΩ, which causes a voltage drop of 57 V (peak value) or 40 V (effective value), respectively, over each resistor at a current of 0.233 mA (peak value). When the protective impedance only comprises two resistors connected in series, which leads to a higher voltage difference, the creepage distance without isolating layer must be at least 5 mm, with isolating layer 4 mm. Compared with protective impedances with two resistors, the dimensions of such with three resistors can be reduced. The component shown in FIG. 3 only has to be 11 mm long, 2.5 mm wide and 0.6 mm thick.

As the protective impedance according to FIG. 3 is made as a discrete component 23, the result is a flexible manufacturing, as through the fitting of a different discrete component the electronic circuit can quickly be switched from a 230 V to a 110 V voltage supply.

According to FIG. 4 the discrete component 23 is fitted so on the carrier 14 that the live components, including the resistors 27, 28 and 29, are arranged on the surface of the basic substrate 24 facing the carrier 10. The free surface of the basic substrate 23 can be touched without problems. For fitting, the components 24 arranged on the component 23 are fixed on the carrier 14 by means of pins. Also the connection terminals 25 and 26 can be bond or soldered onto the carrier 14.

FIG. 5 shows that the component 23 is fitted direct on the carrier 14 so that the active components, including the resistors 27, 28 and 29, are arranged on the free surface. The whole arrangement is covered by the switching relay 12 so that a space saving arrangement and a shock protection are provided.

FIG. 6 shows an additional embodiment, in which several resistors 34 connected in series are arranged as an intermediary layer between two isolating layers 35 and 36 in a multilayer printed circuit board 37, thus creating a protective impedance 38.

The protective impedances can also be applied direct on the carrier as thick film. The electronic circuit 1 can be completely or partly made up of standard components, such as Surface Mounted Devices (SMD). The switching relay 12 can also be placed outside the carrier 14, as shown in FIG. 1.

In the circuit diagram in FIG. 7 the protective impedances 5 and 6 connected to the connections 3 and 4 of the mains N each have three ohmic resistors R1, R2, R3 and R4, R5, R6 connected in series. The resistors R1, R2, R3 correspond to the resistors 27, 28, 29 in FIG. 3.

If it is required that the current flowing does not exceed 0.7 mA (peak value), when an operator at the same time touches the mains connection 4 and the electronic circuit 1, that is, short-circuits the protective impedance 6, an alternating voltage of 240 V will result in a resistance value of 485 kΩ for the protective impedance 5 and of 162 kΩ for each of the same resistors R1, R2 and R3. These resistance values determine the maximum possible operating current, which would in this case amount to 0.35 mA.

When according to EN 60730-1 an even higher security is required, so that the 0.7 mA should not be exceeded even on a bypassing of one of the resistors of the protective impedance 5, for example the resistor R1, each of the resistors R2 and R3, and thus also all the resistors R1 to R6, have the value of 243 kΩ. In this case the maximum operating current is 0.233 mA. Four resistors in series would give an operating current of 0.262 mA and five resistors 0.28 mA. In theory, an infinite number of resistors could be used, which would cause an asymptotic approach to the limit value of 0.35 mA.

However, the series connection of more than three resistors leads to a relatively long protective impedance element. FIG. 8 therefore shows an alternative in which each of the protective impedances 5 and 6 is made up of the parallel connection of two branches, each having three ohmic resistors connected in series, that is, the single impedances R1 to R6 and R1' to R6'. If the protective impedance 6 is bypassed by an operator, and the resistor R1 is short-circuited, the resistors R2 and R3 in parallel with R4, R5 and R6 must in total have a resistance of 485 kΩ. This is reached, when each of the latter resistors have 404 kΩ. The total resistance of the circuit then amounts to 1,212 kΩ, which corresponds to an operating current of 0.28 mA. This value is exactly the same as with five resistors connected in one single series, however the component is considerably shorter. Of course, each of the parallel branches may also comprise two or four or more resistors connected in series.

FIG. 9 shows a top view of an embodiment of a protective impedance corresponding to that in FIG. 8, modified slightly in relation to FIG. 3. The same parts have the same reference numbers. Numbers of corresponding parts are marked with ' or ". The thick film resistors 27', 28' and 29' correspond to the resistors R1, R2 and R3 in FIG. 8, the thick film resistors 27", 28" and 29" correspond to the resistors R1', R2' and R3' in FIG. 8. The two resistor series connections are separated from each other by a clearance 39 presenting an isolation distance of at least d=0.2 mm. Similar calculations can be made, when the electronic circuit 1 has an earth connection E.

What is claimed is:

1. Electronic temperature for refrigeration appliances, comprising mains connections and an electronic circuit having a power supply, a control unit and measuring and setting elements, the mains connections being connected with the power supply via protective impedances connected in series, and the electronic circuit being dimensioned for an operating current of maximum 0.35 mA (peak value) when connected to an AC mains and maximum 1 mA when connected to a DC mains, and in which at least the protective impedances, the power supply, and the control unit are arranged on a common carrier.

2. Temperature controller according to claim 1, in which the protective impedances are formed by discrete components fitted on the carrier, live parts being arranged on surfaces of components facing the carrier.

3. Temperature controller according to claim 1, in which the protective impedances are covered by a component, which is also located on the carrier.

4. Temperature controller according to claim 3, in which the component comprises the housing of a switching relay.

5. Temperature controller according to claim 1, in which the carrier is a printed circuit board and the protective impedances are arranged inside the printed circuit board.

6. Temperature controller according to claim 1, in which the carrier has sensor connections.

7. Temperature controller according to claim 1, in which a setting potentiometer is located on the carrier.

8. Temperature controller according to claim 1, in which the protective impedances are formed by discrete components, each having a basic substrate having connection terminals on opposite ends and between which the single impedances are arranged.

9. Temperature controller according to claim 1, in which the single impedances are ohmic resistors.

10. Temperature controller according to claim 9, in the ohmic resistors are applied on the basic substrate as thick film.

11. Temperature controller according to claim 1, in which each protective impedance comprises three ohmic resistors connected in series.

12. Temperature controller according to claim 11, in that each ohmic resistor is covered by an isolating layer and is dimensioned so that a voltage drop of maximum 50 V effective value will occur at maximum operating current.

13. Temperature controller according to claim 1, in which the control unit drives a bistable switching relay.

14. Temperature controller according to claim 13, in which a storage capacitor is connected to the bistable switching relay.

15. Temperature controller according to claim 14, in which the bistable switching relay and the storage capacitor are also located on the carrier.

16. Temperature controller according to claim 1, in which the control unit samples measuring values from sensors connected to the control unit at temporal intervals.

17. Temperature controller according to claims 1, in which each protective impedance has at least two parallel branches, each comprising at least two single impedances connected in series.

18. Electronic temperature controller for refrigeration appliances, comprising mains connections and an electronic circuit having a power supply, a control unit and measuring and setting elements, the mains connections being connected with the supply via protective impedances comprising at least two single impedances connected in a series, and the electronic circuit having an earth connection and being dimensioned for an operating current of less than 0.7 mA (peak value) when connected to an AC mains or less than 2 mA when connected to a DC mains.

19. Temperature controller according to claim 18, in which at least the protective impedances, the power supply and the control unit are arranged on a common carrier.

20. Temperature controller according to claim 19, in which the protective impedances are formed by discrete components fitted on the carrier, live parts being arranged on surfaces of components facing the carrier.

21. Temperature controller according to claim 19, in which the protective impedances are covered by a component, which is also located on the carrier.

22. Temperature controller according to claim 21, in which the component comprises the housing of a switching relay.

23. Temperature controller according to claim 19, in which the carrier is a printed circuit board and the protective impedances are arranged inside the printed circuit board.

24. Temperature controller according to claim 19, in which the carrier has sensor connections.

25. Temperature controller according to claim 19, in which a setting potentiometer is located on the carrier.

26. Temperature controller according to claim 18, in which the protective impedances are formed by discrete components, each having a basic substrate having connection terminals on opposite ends and between which the single impedances are arranged.

27. Temperature controller according to claim 18, in which the single impedances are ohmic resistors.

28. Temperature controller according to claim 27, in the ohmic resistors are applied on the basic substrate as thick film.

29. Temperature controller according to claim 18, in which each protective impedance comprises three ohmic resistors connected in series.

30. Temperature controller according to claim 29, in that each ohmic resistor is covered by an isolating layer and is dimensioned so that a voltage drop of maximum 50 V effective value will occur at maximum operating current.

31. Temperature controller according to claim 18, in which the control unit drives a bistable switching relay.

32. Temperature controller according to claim 31, in which a storage capacitor is connected to the bistable switching relay.

33. Temperature controller according to claim 32, in which the bistable switching relay and the storage capacitor are also located on a common carrier.

34. Temperature controller according to claim 18, in which the control unit samples measuring values from sensors connected to the control unit at temporal intervals.

35. Temperature controller according to claims 18, in which each protective impedance has at least two parallel branches, each comprising at least two single impedances connected in series.

* * * * *